United States Patent [19]

Dorawala et al.

[11] 4,046,869

[45] Sept. 6, 1977

[54] STEAM REFORMING PROCESS

[75] Inventors: Tansukhlal G. Dorawala, Wappingers Falls; Russell R. Reinhard, Hopewell Junction, both of N.Y.

[73] Assignee: Texaco Inc., New York, N.Y.

[21] Appl. No.: 657,139

[22] Filed: Feb. 11, 1976

[51] Int. Cl.$^2$ .................. C01B 1/18; C01B 2/16
[52] U.S. Cl. .................. 423/652; 48/214 A; 252/420; 252/373; 423/653
[58] Field of Search ............ 423/652, 653, 654, 651; 252/373, 420; 48/214; 208/48

[56] References Cited

U.S. PATENT DOCUMENTS

| | | | |
|---|---|---|---|
| 2,119,565 | 6/1938 | Williams | 423/654 |
| 2,828,196 | 3/1958 | Glover et al. | 423/651 X |
| 3,132,091 | 5/1964 | Young | 252/420 X |
| 3,365,387 | 1/1968 | Cahn et al. | 208/48 R |
| 3,422,031 | 1/1969 | Katsobashvili et al. | 423/651 |

*Primary Examiner*—Edward J. Meros
*Attorney, Agent, or Firm*—Thomas H. Whaley; Carl G. Ries; Carl G. Seutter

[57] ABSTRACT

Hydrocarbons are reformed in a short cycle process characterized by a reaction period of 30–180 seconds followed by a regeneration period of 90–540 seconds — thus permitting attainment of improved conversion and yield of hydrogen.

17 Claims, No Drawings

STEAM REFORMING PROCESS

FIELD OF THE INVENTION

This invention relates to the conversion of hydrocarbons. More particularly, it relates to the steam reforming of hydrocarbons including alkylaromatic hydrocarbons such as toluene.

BACKGROUND OF THE INVENTION

As is well known to those skilled in the art, steam reforming has commonly been carried out by passing a hydrocarbon together with steam through a furnace at 650°–950° F to yield a product containing principally hydrogen. Steam reforming is carried out in the presence of catalysts; and it is found that typical prior art processes are less than fully satisfactory because of low yields of product, degradation of catalyst, poor product selectivity etc.

It is an object of this invention to provide a steam reforming process particularly charactrerized by high conversion and high yield. Other objects will be apparent to those skilled in the art.

STATEMENT OF THE INVENTION

In accordance with certain of its aspects, the novel process of this invention for steam reforming a charge hydrocarbon charge may comprise passing a mixture of steam and charge hydrocarbon into contact with a steam reforming catalyst containing oxide of nickel and oxide of chromium at steam reforming conditions for 30–180 seconds during which time the activity of the steam reforming catalyst, measured by the mole percent conversion of charge hydrocarbon to product hydrogen, decreases during a reaction period;

interrupting said reaction period when the activity of said catalyst has decreased;

contacting said catalyst of decreased activity with steam during a regeneration period at regeneration conditions for 90–540 seconds, as the activity of said catalyst increases, thereby forming regenerated catalyst; and recovering product hydrogen.

DESCRIPTION OF THE INVENTION

In accordance with certain of its aspects, the charge hydrogen which may be treated by the process of this invention may be a stream typically having a boiling point of 176°–1292° F (80°–700° C). The stream may contain alkylaromatic hydrocarbons, either pure or in admixure, in varying quantities. This charge stream may typically contain toluenes, xylenes, ethyl benzenes, propyl benzenes etc. A preferred charge hydrocarbon contains a toluene; and in the preferred embodiment, it may be substantially entirely toluene se. In another embodiment of the invention, the charge stream may contain hydrocarbons having 9–11 carbon atoms, typified by trimethylbenzene; indane; methylethyl benzenes; methyl naphthalenes; etc.

Typical charge streams which may be treated by the process of this invention may include aromatic extracts or reformate streams containing alkylaromatic hydrocarbons. Illustrative of such charge streams may be a reformate commonly containing the following components (% by volume):

TABLE

| Component | Broad | Typical |
|---|---|---|
| Paraffins | 30–45 | 40 |
| Olefins | 0–2 | 1 |
| Naphthenes | 1–5 | 3 |
| Aromatics | 45–65 | 56 |

Of the aromatic content of the reformate, 80%–100%, typically 90% may be present as alkylaromatic hydrocarbons.

This reformate may have a (RON Clear) octane number of 90, an IBP of 115° F, an EBP of 410° F, and an API gravity of 47.7.

Particularly desirable results may be achieved by use, as the hydrocarbon charge, of compositions containing substantial proportions of toluene.

In accordance with certain of its other aspects, the charge hydrocarbon may be a non-aromatic hydrocarbon such as an aliphatic hydrocarbon, either pure or in admixture, typically having a boiling point of 176°–1292° F (80°–700° C). Light paraffinic streams may be employed.

Typical of such streams are those containing predominantly lower paraffins including butanes, pentanes, etc. and illustrative of such streams are light straight run products, various condensates, and raffinates from which aromatics have been extracted.

Although the charge may be a pure $C_4$ or $C_5$ paraffin, it more commonly may be a mixture containing $C_4$ to $C_8$ paraffins. The paraffin content may be 60%–100%, preferably 70%–85%, say about 80%. The charge may also contain naphthenes in amount of 5%–20%, preferably 5%–15%, say 12%. Lesser amounts of other components may be present.

A typical charge stream may be a heavy Udex raffinate (from which the aromatics have been extracted) having the following composition:

| | Udex Raffinate | |
|---|---|---|
| | % by Volume | |
| Component | Broad | Typical |
| Paraffins | 70–85 | 80.7% |
| Naphthenes | 5–20 | 7.8 |
| Aromatics | 5–15 | 11.5 |
| | | 100.0 |

This raffinate may have an IBP of 190° F, an EP of 275° F, and an API Gravity of 70.1.

Another typical charge stream may be a light straight run distillate (obtained from debutanization of a straight run gasoline) having the following composition:

| | Light Straight Run Distillate | |
|---|---|---|
| | % by Volume | |
| Component | Broad | Typical |
| Paraffins | 80–99 | 94.0 |
| Naphthenes | 0–8 | 3.0 |
| Aromatics | 0–15 | 3.0 |

This distillate may have an IPB of 92° F, an EP of 300° F, and an API gravity of 79.2.

Particularly desirable results may be achieved by use, as the hydrocarbon charge, of a non-aromatic composition containing substantial proportions of paraffinic and/or naphthenic hydrocarbons.

Steam reforming of the hydrocarbon charge may be carried out by passing the charge at 800°–1100° F typically 850°–1000° F to a steam reforming zone. Clearly the preferred temperature of reaction may depend upon many factors including the nature of the charge material, the purity of the charge material, the ability of the processor to handle by-products, etc. The pressure of reaction may be 0–100 psig, preferably 5–50 psig, say 13 psig.

Steam reforming in accordance with this invention may be carried out by passing the charge hydrocarbon and steam through a reaction zone. Preferably the mole ratio of steam to hydrocarbon entering the reaction zone may be greater than about 15, preferably 25–125, more preferably 40–60, commonly about 50.

As the mole ratio of steam to hydrocarbon decreased below 30 and especially below 15, the results (as measured e.g. by hydrogen yields) are less satisfactory; and competing reactions may prevail to an undesired degree — especially so when the charge hydrocarbon contains aromatics such as toluene.

Thus in summary, the conditions of temperature T in degrees F, pressure in psig, and mole ratio R of steam to hydrocarbon may be as set forth in the following table:

| TABLE | |
|---|---|
| Condition | Broad |
| Temperature ° F | |
| Broad | 800–1100 |
| Pref. | 850–1000 |
| Typical | 900 |
| Mole Ratio | |
| Broad | 25–125 |
| Pref. | 40–60 |
| Typical | 52 |
| Pressure psig | |
| Broad | 0–100 |
| Pref. | 5–50 |
| Typical | 13 |

The steam employed may preferably correspond to. 2–9, say 4 times the stoichiometric amount. The weight hourly space velocity of the charge hydrocarbon may be 0.01–0.2, preferably 0.05–0.15, say about 0.07.

The steam reforming catalysts which may be used in practice of the process of this invention may be supported catalysts or unsupported catalysts. Typical of the unsupported catalysts may be those containing oxides of a Group VIII metal and of a Group VI B metal.

The Group VIII metal may include iron Fe, cobalt Co, nickel Ni, ruthenium Ru, rhodium Rh, palladium Pd, osmium Os, iridium Ir, and platinum Pt. Preferably the Group VIII metal may be nickel or cobalt; and in the most preferred embodiment, it is nickel.

The Group VI B metal may be chromium Cr, molybdenum Mo, tungsten W; and in the preferred embodiment, it is chromium Cr.

A preferred unsupported catalyst may contain nickel and chromium and may be characterized by the formula $x$ NiO: $y$ Cr$_2$O$_3$ wherein $x$ is 0.08–1.28, preferably 0.25–1.11, say 0.75 and $y$ is 0.026–0.62, preferably 0.11–0.53, say 0.29. Typical of such catalysts is that available as 0.85 Ni — 0.33 Cr$_2$O$_3$ which in fact corresponds to the formula 0.75 NiO : 0.29 Cr$_2$O$_3$.

A preferred supported catalyst which may be employed in practice of the process of this invention may comprise a catalyst support containing oxides of a Group VIII metal and of a Group I A metal plus preferably oxides of a metal of Group VI B.

The Group I A metal, an alkali metal, may be lithium Li, sodium Na, potassium K, rubidium Rb, or caesium Cs. In the preferred embodiment, it is potassium K.

The catalyst support may be active or inactive or inert. Typically the support may be a clay, a silica, a metal oxide, a zeolite, etc. The preferred porous materials may include alumina, silica, silica-alumina, silica-magnesia, silica-titania, silica-beryllia, silica-zirconia, silica-alumina-magnesia, etc. The preferred support is an inert support such as alumina, preferably gamma-alumina.

In typical practice of the process of this invention, the supported catalyst composition may contain the following components in the indicated parts by weight (expressed as oxide):

| TABLE | | | |
|---|---|---|---|
| Component | Broad | Preferred | Typical |
| Group VIII | | | |
| Fe-Co-Ni | 5–40 | 6–20 | 15 |
| or | | | |
| Ru-Rh-Pd | | | |
| Os-Ir-Pt | 0.5–10 | 0.5–5 | 1 |
| Group VI B | 0–40 | 10–38 | 15 |
| Group I A | 0.01–5 | 1–4 | 2 |
| Support | 15–99.5 | 38–84 | 68 |

The preferred catalyst may be that containing nickel-chromium-potassium-aluminum; and the catalyst composition may contain the following (expressed as oxide):

| TABLE | | | |
|---|---|---|---|
| Component | Broad | Preferred | Typical |
| Ni | 5–40 | 6–20 | 15 |
| Cr | 0–40 | 10–38 | 15 |
| K | 0.01–5 | 1–4 | 2 |
| Al | 15–99.5 | 38–84 | 68 |

In terms of molar proportions, the catalyst may be represented by the formula $a$ (VIII)$_{2/n}$O : $b$ (VI)$_{2/m}$O : $c$ (I)$_2$O wherein (VIII) represents a metal of Group VIII of the Periodic Table having a valence $n$, (VI) represents a metal of Group VI B of the Periodic Table having a valence $m$, (I) represents a metal of Group I A of the Periodic Table. $a$ may be 0.002–0.75, preferably 0.002–0.38, say 0.20; $b$ may be 0–0.78, preferably 0.13–0.75, say 0.29; and $c$ may be 0.00003–0.17, preferably 0.003–0.13, say 0.02.

In one preferred embodiment, the catalyst may be represented by the formula $a$ NiO : $b$ Cr$_{2/3}$O : $c$ K$_2$O wherein $a$ is 0.08–0.54, preferably 0.08–0.27, say 0.20; $b$ is 0–0.78, preferably 0.21–0.75, say 0.29; and $c$ is 0.01–0.05 preferably 0.01–0.04, say 0.02.

When the support is alumina, as in the preferred embodiment, the catalyst composition may be represented by the formula $a$ NiO : $b$ Cr$_{2/3}$O : $c$ K$_2$O : $d$ Al$_2$O$_3$ wherein $a$, $b$ and $c$ are as supra and $d$ is 0.15–0.95, preferably 0.38–0.84, say 0.68.

The supported catalyst may be prepared by immersing a catalyst support in a solution containing the metal ions. The support, typically a gamma-alumina extrudate of 1.5 mm diameter and 10 mm length may first be steam sintered at 900°-1400° F, say 1110° F for 5-25 hours, say 12 hours. During sintering, there may be passed through the bed air at VHSV of 40-600, say 230 together with steam at VHSV of 0.05-0.1, say 0.06. (All VHSV are measured at standard temperature and pressure unless otherwise stated). The steamed alumina is then calcined for 1-5, say 2 hours at 900°-1200° F, say 1000° F. The initial surface of the alumina, typically 200-400, say 231 meter $^2$/gram may be decreased to 70%-95%, say about 83% to a value of 140-380, say 192 meter $^2$/gram.

The support (typically 242 parts), preferably as so treated, is cooled to 32°-80° F, say about 32° F and wetted with 200-2525 parts, say 890 parts of solution prepared by dissolving soluble decomposable salts of metals of Group VI B and Group I A in aqueous solution. Preferably 5-1000 parts more preferably 200-1000, say 792 parts of salt of Group VI B metal, typically chromium nitrate nonahydrate Cr $(NO_3)_3 \cdot 9H_2O$ and 5-25 parts, preferably 10-23 say 17.2 parts of salt of Group I A metal, typically potassium nitrate are dissolved in 10-1500 parts, say 80 parts of water to yield total solution in amount of 20-2525 parts, say 890 parts. (Although nitrates of the metals are preferably employed, acetates, formates, citrates, or other soluble, decomposable salts may be used).

The solution is poured over the support and is stirred intermittently for 0.5-10 hours, say 1 hour; and the solution (50-2400 parts, typically 731 parts) may then be decanted. The impregnated support is dried at 212°-400° F, say 300° F, then heated to decomposition temperature of typically 650°-1000° F, say 700° F, and calcined for 1-10 hours, say 2 hours at 700°-1400° F, say 1000° F. This procedure is preferably repeated 2-4, preferably 2 times more until all the metal salt solution is absorbed by the support. The final pre-catalyst so prepared in amount of 242-1500 parts, say 383 parts may be characterized by the formula $$b\ (VI)_{2/m}O \cdot c\ (I)_2O \cdot d\ Al_2O_3$$

wherein (VI) represents a metal having valence $m$ of Group VI B of the Periodic Table, (I) represents a metal of Group I A of the Periodic Table, $b$ is 0-0.78, preferably 0.13-0.75, say 0.28, $c$ is 0.00003-0.17, preferably 0.003-0.13, say 0.02, and $d$ is 0.15-0.95, preferably 0.38-0.84, say 0.68. (Supports other than or in addition to $Al_2O_3$ may be present).

In one preferred embodiment, the composition of the pre-catalyst may be $$b\ Cr_{2/3}O : c\ K_2O : d\ Al_2O_3$$

where $b$ is 0.25, $c$ is 0.02, $d$ is 0.59.

292-1500 parts, say 383 parts of pre-catalyst may be cooled to 32°-80° F, say 32° F and impregnated with decomposable soluble salt of a Group VIII metal. Preferably the solution may contain 50-700 parts, say 267 parts of $Ni(NO_3)_2 \cdot 6H_2O$ in 50-1400 parts, say 263 parts of water. After 0.5-10 hours, say 1 hour of intermittent stirring, the excess non-absorbed solution is decanted and the solids dried for 2-18 hours, say 16 hours at 212°-400° F, say 300° F. The dried solid is reimpregnated with the remaining salt solution for 0.5-10 hours, say 1 hour and dried again for 2-18 hours, say 16 hours at 212°-400° F, say 300° F. Further treatment includes heating for 0.5-24 hours, say 1 hour, at 650°-1000° F, say 700° F in a flowing stream of air to decompose the decomposable salts, typically nitrates, and then calcining for 1-10 hours, say 2 hours at 600°-1000° F, say 700° F to yield 260-1850 parts, say 462 parts having a density of 0.7-1.5, say 1.11.

The product catalyst so prepared may be characterized by the formula $$a\ (VIII)_{2/n}O : b\ (VI)_{2/m}O : c\ (I)_2O : d\ (Supp)$$

wherein all the symbols are as noted supra except that $a$ is 0.002-0.75, preferably 0.002-0.38, say 0.20, (VIII) represents a metal, having a valence $n$, of Group VIII of the Periodic Table, preferably nickel, and (Supp) represents the catalyst support, preferably $Al_2O_3$.

Preferred catalyst compositions may have the formula:
0.23 NiO : 0.02 $K_2O$ : 0.79 $Al_2O_3$
0.2 NiO : 0.1 $Cr_{2/3}O$ : 0.02 $K_2O$ : 0.68 $Al_2O_3$
0.17 NiO : 0.25 $Cr_{2/3}O$ : 0.02 $K_2O$ : 0.48 $Al_2O_3$
0.20 CoO : 0.20 $Cr_{2/3}O$ : 0.02 $Na_2O$ : 0.34 $SiO_2$ Expressed on a weight basis, the catalyst may have the composition set forth in the following Table:

TABLE

| Component | Broad | Preferred | Typical |
|---|---|---|---|
| Group VIII Fe-Co-Ni or Ru-Rh-Pd | 6-40 | 6-20 | 15 |
| Os-Ir-Pt | 0.5-10 | 0.5-5 | 1 |
| Group VI B | 0-40 | 10-38 | 15 |
| Group I A | 0.01-5 | 1-4 | 2 |
| Support | 15-99.5 | 38-84 | 68 |

A preferred composition may contain 17.7% NiO 13.2% $Cr_2O_3$, 1.9% $K_2O$, and 61.6% $Al_2O_3$. Another preferred composition may contain 11.9% NiO, 30.4% $Cr_2O_3$, 1.4% $K_2O$, and 48.2% $Al_2O_3$. Another preferred composition may contain 15.5% NiO, 1.8% $K_2O$, and 74.1% $Al_2O_3$ -percentages in this paragraph being on a weight basis.

The catalyst composition may be in the form of pellets, cylinders, or randomly shaped particles; a typical catalyst composition may be in the form of cylinders, of diameter 1-15 mm, say 1.5 mm and height 1-15 mm, say 8-10 mm.

The catalyst may be activated prior to use (eg in steam reforming). Preferably activation may be carried out by the process which comprises a. maintaining the unactivated catalyst in a hydrogen atmosphere at 800°-1000° F, say 900° for 10-30, say 14 hours thereby forming a hydrogen-treated cayalyst;

b. maintaining the hydrogen-treated catalyst in a steam-hydrogen atmosphere at 800°-1000° F, say 900° F for 2-10, say 2 hours thereby forming a steamed hydrogen-treated catalyst; and c. preferably cooling (or heating) the steamed hydrogen-treated catalyst to reforming temperature in a steam or steam-hydrogen atmosphere thereby forming an activated catalyst.

Activation of the steam reforming catalyst may preferably be carried out after the catalyst is in place in the reaction vessel. The vessel may be filled with catalyst composition to a bed bulk density of 50-80 pcf, say 70 pcf. In the first portion of the activation operation, the catalyst composition is heated to 800°-1000° F, preferably 900°-1000° F, say 900° F in the presence of a reducing gas containing at least about 30 mole % hydrogen. The gas will preferably be substantially free of active components (other than hydrogen) which are capable of reacting with any of the materials in the system. It is particularly desirable that the gas be free of oxidizing components including oxygen.

The gas may contain (in addition to hydrogen) helium or more preferably light paraffins such as methane, ethane, propane, etc. Hydrogen may be present typically in amount of 30 mole % - 100 mole %, preferably 80 mole % - 100 mole %, say 100 mole %; i.e. the preferred embodiment may be that in which the gas consists essentially of hydrogen.

Preferably the catalyst composition may be maintained for 10-30 hours, typically 14-16 hours, say 14 hours in a stream of flowing hydrogen typically flowing at a space velocity VHSV (STP) greater than about 3, more preferably greater than 100, say 100-500, typically 300.

When activation is carried out at atmospheric pressure, as in the preferred embodiment, the partial pressure of hydrogen may be at least about 9 psia (400 mm Hg), preferably 12-15 psia, say 15 psia (760 mm Hg).

In the preferred second portion of the activation cycle, the hydrogen-treated catalyst may be maintained at 800°-1000° F, preferably 900°-1000° F, say 900° F (most preferably at about the same temperature as that employed in the first portion) in a flowing stream of hydrogen and steam. This stream may contain 15-50 mole %, preferably 20-40 mole %, say 30 mole % of hydrogen, 50-85 mole %, preferably 60-80 mole %, say 70 mole % of steam, and 0-10 mole %, preferably 0-5 mole %, say about 0 mole % of inert gas such as helium, nitrogen, or light paraffins. Preferably the gas may consist essentially of hydrogen and steam in molar ratio of 0.2-1, typically 0.25-0.67, say 0.42:1.

When activation is carried out at atmospheric pressure, as in the preferred embodiment, the partial pressure of hydrogen may be 100-380, preferably 150-300, say 240 mm Hg; and the partial pressure of steam may be 380-660, preferably 460-610, say 520 mm Hg.

The second portion of the activation procedure may be carried out for 2-10 hours, preferably 2-5 hours, say 2 hours in a stream of flowing gas at a space velocity VHSV (STP) greater than about 1.5, preferably greater than 50, say 50-250, typically 150.

Post activation temperature conversion is typically carried out by maintaining the activated catalyst in a stream of flowing steam for 1-10 hours, preferably 1-5 hours, say 2 hours as the temperature is lowered to the steam reforming temperature of 800°-1100° F, preferably 850°-1000° F, say 900° F. Preferably steam is present during post-activation in amount of 50-100 mole %, typically 80-100 mole %, say about 100 mole % of the flowing stream.

It is a feature of the process of this invention that steam reforming be carried out by passing charge steam and charge hydrocarbon through a bed of steam reforming catalyst at steam reforming conditions for 30-180 seconds during a reaction period.

Steam reforming of the hydrocarbon charge may be carried out by passing the charge at 800°-1100° F, preferably 850°-1000° F, say 900° F and pressure of 0-100 psig, preferably 5-50 psig, say 13 psig together with steam in amount of 25-125 moles, preferably 40-60 moles, say 52 moles per mole of hydrocarbon charge (corresponding to 200-900%, say 400% of the stoichiometric quantity) to a reaction zone. In commercial practice it may be desirable to operate at e.g. 13 psig to facilitate product recovery.

During steam reforming at these conditions, the charge hydrocarbon is converted to product gas containing per mole of eg charge toluene converted, 5-50 moles, say 35 moles of hydrogen, 0-10, say 0.5 moles of methane, 1-15, say 14 moles of carbon dioxide, and 0-2, say 0.4 moles of carbon monoxide.

During the reaction period of the short cycle operation, which occupies 30-180 seconds, preferably 30-120 seconds, say about 60 seconds, the activity of the steam reforming catalyst decreases. Typically this activity (as measured in terms of the mole percent conversion of charge hydrocarbon) starts out at about 40%-100%, preferably 80%-100%, say 100%. As the reaction proceeds during the reaction period, the activity decreases so that at the end of the reaction period, it is only 20%-90%, preferably 50%-85%, say 75%.

When the activity has decreased to less than about 90% of the initial acitivity the reaction period is terminated or interrupted. Typically this occurs when the activity is 60%-85%, say 75% of the initial activity.

At the point when the reaction period is interrupted, the activity may be 20%-90%, preferably 50%-85%, say 75%.

Interruption or termination of the reaction period is effected by decreasing the flow (preferably to zero) of the charge hydrocarbon.

The catalyst of decreasd activity is preferably contacted with steam during a regeneration period of 90-540 seconds, preferably 90-450 seconds, say 180 seconds. The ratio of the regeneration time to the reaction time may be 1-5, preferably 2-4, say 3.

Regeneration of the catalyst of decreased activity may be effected by passing steam through the catalyst bed at 800°-1000° F, preferably 850°-1000° F, say 900° F and pressure of 0-100 psig, preferably 5-50 psig, say 13 psig and at a WHSV of 0.01-10, preferably 0.1-2, say 0.9.

It is a feature of the process of this invention that regeneration may be carried out at substantially the same conditions as reaction; and in the preferred embodiment, the change from reaction to regeneration may be effected by decreasing, or preferably stopping, the flow of hydrocarbon - all other conditions preferably remaining subsantially the same. The flow of charge hydrocarbon during regeneration may be 0%-50%, preferably 0%-10%, say 0% of the flow of charge hydrocarbon during the reaction period.

During regeneration, the activity of the catalyst may be increased to 30%-100%, preferably 72%-100%, say 100%. Typically the catalyst is regenerated to a level at which the activity is 75%-100%, preferably 90%-100%, say 100% of that prevailing at the beginning of the reaction period.

The so regenerated catalyst may be used in a subsequent reaction period — which may be followed by a subsequent regeneration period; etc. Operation may be carried out for an indefinitely long time using the short cycling steam reforming process of this invention with alternating reaction and regeneration periods.

The product gas recovered from the process of this invention typically contains little or no unreacted charge. Conversions of greater than 80%-90% are attained and in typical operation the conversion of charge is 100%.

In the case of a pure toluene charge for example, the product (moles per mole of charge toluene) may contain the following:

TABLE

| Component | Broad | Preferred | Typical |
|---|---|---|---|
| Unreacted toluene | 0-5 | 0-1 | 0 |
| hydrogen | 5-50 | 30-40 | 35 |
| methane | 0-10 | 0-1 | 0.5 |
| CO | 0-2 | 0-1 | 0.4 |
| $CO_2$ | 1-15 | 10-15 | 14 |

The novel process of this invention permits attainment of more product per pound of catalyst than do typical prior processes. Commonly the amount of eg hydrogen product per pound of catalyst may be increased by a factor of 5-50 say 20, over and above that heretofore achieved. Typically 5-35 moles of hydrogen (per mole of eg toluene charged) are attained in contrast to 1-2 moles of hydrogen attained in control processes.

It is also a particular feature of the process of this invention that it permits easy operation with no pressure buildup. The catalyst does not, during the course of the instant process, experience any substantial build-up of carbon as is typical of control processes operating outside the scope of this invention.

DESCRIPTION OF PREFERRED EMBODIMENTS

Practice of the process of this invention will be apparent to those skilled in the art from the following illustrative embodiments wherein, as elsewhere in this description, all parts are parts by weight unless otherwise specifically stated.

EXAMPLE I

An unsupported catalyst containing nickel oxide and chromium oxide (having the empirical formula 0.85NI:0.39 $Cr_2O_3$, but actually corresponding to 0.75NiO:0.29 $Cr_2O_3$), in the form of cylindrical extrudates 0.125 inch diameter and 0.125 inch height are charged to a vertical fixed bed tubular reactor one inch in diameter and 18 inches long. The catalyst is centered in the reactor by 0.25 inch Berl saddles; and the reactor is operated in a downflow mode.

Steam is formed by pumping water to a preheater; and toluene is admitted to the steam line. The mixture passes through a second preheater prior to admission to the reactor. The upper portion of the reactor, packed with Berl saddles, serves as a preheater to bring the feed mixture to desired reaction temperature. The reactor is operated at near atmospheric pressure. The reactor effluent is passed through a cold water condenser and then into a receiver in an ice-water bath. Liquid product is essentially water. The off-gas volume is measured by wet test meter; and the off-gas samples are analyzed by mass spectroscopy.

The catalyst is activated by heating at a rate of 200° F per hour to 900° F in the presence of flowing hydrogen at a VHSV (STP) of 600. The catalyst is then held at 900° F for 14 hours in flowing hydrogen (VHSV at STP of 300) and then at 900° F for 2 hours in flowing hydrogen at VHSV (STP) of 300 and flowing steam at WHSV of 0.30.

In the continuous flow operation of control Example I, steam and toluene are charged at constant rate and the run is considered started when a sudden increase in off-gas is noted.

In Control Example I, carried out under continuous flow operation in the presence of the nominal "0.85Ni-0.33 $Cr_2O_3$" catalyst, the inlet temperature at which toluene is admitted to the catalyst bed is maintained within the range of 910°-950° F. Toluene is charged at a WHSV of 0.78. The steam-to-toluene mole ratio is 6. The reactor pressure at the start is atmospheric and it rises to 15 psig at the end of each cut period of 5 minutes during which separate samples are taken.

The toluene conversion is 100% and the carbon balance is 26%. The carbon not accounted for in the product is deposited on the catalyst. The gas yield, moles/mole of toluene converted is as follows:

| Hydrogen | 1.47 |
|---|---|
| Methane | 1.58 |
| Carbon Dioxide | 0.18 |
| Carbon Monoxide | 0.05 |

EXAMPLES II-XI

In this series of examples, the procedure of Example I* was followed except as noted.

During continuous flow operation of control Example I*, the reactor pressure built up rapidly. When the reactor pressure increased to 25 psig, short cycle operation consisting of a reaction period of 60 seconds followed by a regeneration period of 180 seconds was attempted but the pressure continued to increase. Then both toluene and steam flows were stopped and reactor pressure started to drop. After allowing the reactor to stand for 15 minutes at 900° F without any steam or toluene flow, the steam flow was resumed at WHSV of 0.9. The catalyst was allowed to stand at 900° F for 1 hour under flowing steam at WHSV of 0.9. This unplugged the catalyst which had been plugged by the continuous flow operation of Example I*.

Then the short cycle operation (reaction period of 60 seconds, followed by a regeneration period of 180 seconds) was resumed and the data set forth in the following table were obtained. In Examples IX-XI, the reaction time is 30 seconds and the regeneration time is 90 seconds.

| Cut # Example | II | III | IV | V | VI[2] | VII | VIII | IX | X | XI |
|---|---|---|---|---|---|---|---|---|---|---|
| Cut period, min. | 60 | 60 | 60 | 60 | 40 | 60 | 60 | 60 | 60 | 120 |
| Temperature, ° F | 900 | 900 | 900 | 900 | 900 | 895 | 850 | 900 | 920 | 880 |
| Pressure, psig | 12 | 13 | 13 | 13 | 13 | 32 | 90 | 46 | 42 | 55 |
| Reaction/Regeneration, Min. | 1/3 | 1/3 | 1/3 | 1/3 | 1/3 | 1/3 | 1/3 | .5/1.5 | .5/1.5 | .5/1.5 |
| Toluene WHSV[1] | .10 | .11 | .02 | .07 | .07 | .14 | .13 | .07 | .08 | .08 |
| Steam/toluene mole ratio | 44 | 41 | 115 | 54 | 52 | 28 | 25 | 44 | 44 | 42 |
| Toluene conversion, mol % Chg. | 100 | 100 | 100 | 100 | 100 | 100 | 100 | 100 | 100 | 100 |
| Gas yield, moles/mol toluene converted | | | | | | | | | | |
| $H_2$ | 8.86 | 5.25 | 34.7 | 7.03 | 14.18 | 6.57 | 7.53 | 6.80 | 10.00 | 9.74 |
| $CH_4$ | .01 | .05 | .25 | .46 | .04 | .15 | .19 | 5.99 | 1.94 | .22 |
| $CO_2$ | 4.06 | 2.12 | 13.77 | 2.89 | 5.86 | 2.81 | 3.11 | 4.39 | 5.00 | 4.15 |

-continued

|  | II | III | IV | V | VI[2] | VII | VIII | IX | X | XI |
|---|---|---|---|---|---|---|---|---|---|---|
| CO | .09 | .07 | .39 | .22 | .14 | .14 | .17 | 1.02 | .80 | .23 |
| Carbon balance, % Chg. | 60 | 32 | (206) | 51 | 86 | 44 | 50 | 163 | 111 | 66 |
| Gas yield, basis 100% carbon balance, moles/mol toluene converted |  |  |  |  |  |  |  |  |  |  |
| H$_2$ | 14.95 | 16.34 | 16.86 | 13.78 | 16.43 | 14.86 | 15.21 | 4.17 | 9.04 | 14.83 |
| CO$_2$ | 6.85 | 6.6 | 6.69 | 5.66 | 6.79 | 6.36 | 6.28 | 2.70 | 4.52 | 6.32 |

[1] These are calculated on the basis of total cut period which includes both reaction and regeneration cycles. The toluene WHSV and steam:toluene mol ratios during the reaction portion (of the total reaction-regeneration cycle) were the same as those used in the continuous flow operation of control Example I*.
[2] At the end of Example IV, the reactor was flushed with hydrogen and left under hydrogen at 900° F and 90 psig for about 16 hours.

Comparison of the continuous flow Examples and short cycle (Example II-XI) operation data indicates that during continuous flow operation, a major portion of the hydrocarbon charge stock goes to coke (26% carbon recovery), resulting in a rapid pressure buildup. Although it may be possible to operate the reactor in continuous flow for a period somewhat longer than 5 minutes, the results indicate that the catalyst has a very short life. Also, the hydrogen production during continuous flow operation is very low (1.47 moles/mol toluene converted). On the other hand, the results of short cycle, 1 min reaction/3 min regeneration, operation (Ex II to VI) indicate that a complete gasification of toluene is possible without excessive pressure buildup, and that higher hields of hydrogen (5-35 moles/mol toluene converted) can be obtained. Leaving the catalyst overnight under hydrogen had some deleterious effects, and excessive pressure buildup was noticed even with 1 min reaction/3 min regeneration type operation (Ex VII to VIII). However, a cyclic operation with more frequent regenerations, 0.5 min reaction/1.5 min regeneration, (Ex IX-XI) permitted a complete gasification of toluene without any further pressure rise.

Short cycle reaction/regeneration technique employing reaction periods in the range of 30-180 seconds and regeneration periods corresponding to reaction/regeneration ratio in the range of 1-5, permit complete conversion of toluene to a hydrogen rich gas.

EXAMPLE XII

Results comparable to those achieved in Examples II-XI may be achieved by steam reforming a charge sulfolane raffinate having an IBP of 95° F and an EP of 320° F and containing the following:

| Component | Vol % |
|---|---|
| Paraffins | 96 |
| Unsaturates | 2 |
| Naphthenes | — |
| Aromatics | 2 |

EXAMPLE XIII

Results comparable to those of Examples II-XI may be obtained if the catalyst is a supported catalyst containing eg oxides of nickel and potassium on one-sixteenth inch extrudates of American Cyanamide Aero 100 Brand alumina, prepared as follows:

Prior to use, the alumina is charged into a stainless steel tubular reaction and heated to 1110° F for 12 hours while passing steam (WHSV of 0.064) and air (VHSV of 226) through the bed. The steamed alumina is then calcined for 2 hours at 1000° F. The surface area of the alumina is reduced by this treatment from an initial value of 231 m²/g to a final value of 192 m²/g.

166 parts of steam sintered alumina support are placed within a container and chilled in an ice bath. 257 parts of aqueous solution containing 148.5 parts of nickelous nitrate hexahydrate Ni(NO$_3$)$_2$.6H$_2$O and 8.6 parts of potassium nitrate KNO$_3$ are poured over the chilled support. The resulting material is dried by heating overnight at 200° F and then by heating for two hours at 300° F. The metal salts are decomposed by heating in air at 700° F for ca6 hours; and the catalyst is calcined in a muffle furnace at 700° F for 2 hours. The so-prepared catalyst contains 15.5% NiO (12.5% Ni), 1.8% K$_2$O, and 74.15 Al$_2$O$_3$.

The catalyst is charged into a fixed bed tubular reactor (one inch i.d. and 18 inches long) — it is centered in the reactor by 0.25 inch Berl saddles. The reactor is operated in a vertical downflow mode. Steam is formed by passing water to a preheater; and toluene is admitted to the steam line. The mixture is passed through a second preheater before entering the reactor.

The upper part of the reactor, which is packed with Berl saddles also serves as a preheater to bring the feed mixture to desired reaction temperature. Reactor operation is at atmospheric pressure; and the effluent is passed through a cold water condenser and then into a receiver which is cooled to ice-water temperature.

The hydrocarbon recovered (if any) is analyzed by gas chromatography. The off-gas is measured in a wet test meter and analyzed by mass spectroscopy.

In the course of operation, the catalyst is activated by contact with flowing hydrogen (VHSV of 432) as heating is continued at a rate of 200° F/hr to a final temperature of 900° F, followed by holding at 900° F for 14 hours in the presence of flowing (VHSV of 216) hydrogen, followed by holding at 900° F in the presence of steam (water WHSV of 1.0) and hydrogen (VHSV of 216) for 2 hours. Hydrogen flow is then stopped and the catalyst is brought to reaction temperature in the presence of steam.

In operation, a mixture of steam and toluene is charged at constant rate; and the run is considered started when hydrocarbon appears in the receiver. The run is carried out using short cycling i.e. a period of 60 seconds of reaction charging toluene plus steam is followed by a period of 3 minutes of regeneration charging steam alone.

Although this invention has been illustrated by reference to specific embodiments, it will be apparent to those skilled in the art that various changes and modifications may be made which clearly fall within the scope of this invention.

We claim :

1. The method of steam reforming a charge hydrocarbon which comprises
   passing mixture of steam and charge hydrocarbon into contact with a steam reforming catalyst containing oxide of nickel and oxide of chromium at steam reforming reaction conditions including temperature of 800°-1100° F and pressure of 0-100 psig for 30-180 seconds during which time the activity of the steam reforming catalyst, as measured by the mole percent conversion of charge hydrocarbon to product hydrogen, decreases during the reaction period;

interrupting said reaction period when the activity of said catalyst has decreased, said interrupting being effected by decreasing the flow of said charge hydrocarbon;

contacting said catalyst of decreased activity with steam during a regeneration period at regenerating conditions, including temperature of 800°-1100° F and pressure of 0-100 psig for 90-540 seconds, as the activity of said catalyst increases, thereby forming regenerated catalyst; and recovering product hydrogen.

2. The method of steam reforming a charge hydrocarbon as claimed in claim 1 wherein the ratio of regeneration time to reaction time is about 1-5:1.

3. The method of steam reforming a charge hydrocarbon as claimed in claim 1 wherein the ratio of regeneration time to reaction time is about 3:1.

4. The method of steam reforming a charge hydrocarbon as claimed in claim 1 wherein the regeneration time is about 180 seconds and the reaction time is about 60 seconds.

5. The method of steam reforming a charge hydrocarbon as claimed in claim 1 wherein said charge hydrocarbon contains toluene.

6. The method of steam reforming a charge hydrocarbon as claimed in claim 1 wherein said charge hydrocarbon contains an aliphatic hydrocarbon fraction.

7. The method of steam reforming a charge hydrocarbon which comprises passing a mixture of steam and charge hydrocarbon into contact with a steam reforming catalyst at steam reforming reaction conditions including temperature of 800°-1100° F and pressure of 0-100 psig for 30-180 seconds during which time the activity of the steam reforming catalyst, as measured by the mole percent conversion of charge hydrocarbon to product hydrogen, decreases to less than about 90% of the initial activity during a reaction period, interrupting said reaction period when the activity of said catalyst has decreased to less than about 90%, said interrupting being effected by decreasing the flow of said charge hydrocarbon;

contacting said catalyst of decreased activity which steam during a regeneration period at regenerating conditions, including temperature of 800°-1100° and pressure of 0-100 psig for 90-540 seconds, as the activity of said catalyst increases to at least about 75% of its initial activity thereby forming regenerated catalyst; and recovering product hydrogen.

8. The method of steam reforming a charge hydrocarbon as claimed in claim 7 wherein the reaction period is interrupted when the activity of the catalyst is decreased to about 20% - 90% of its initial activity.

9. The method of steam reforming a charge hydrocarbon as claimed in claim 7 wherein the reaction period is interrupted when the activity of the catalyst has decreased to about 60%-85% of its initial activity.

10. The method of steam reforming a charge hydrocarbon as claimed in claim 7 wherein the catalyst is regenerated during the regeneration period to an activity of 75%-100% of the initial activity.

11. The method of steam reforming a charge hydrocarbon as claimed in claim 7 wherein the temperature and pressure are substantially the same during said reaction and said regeneration.

12. The method of steam reforming a charge hydrocarbon as claimed in claim 7 wherein the flow of hydrocarbon during said regeneration period is substantially stopped during said regeneration period.

13. The method of steam reforming a charge hydrocarbon as claimed in claim 7 wherein the flow of hydrocarbon during said regeneration period is 0%-50% of the flow of said hydrocarbon during said reaction period.

14. The method of steam reforming charge toluene which comprises passing a mixture of steam and toluene into contact with a steam reforming catalyst at steam reforming conditions including temperature of 800°-1100° F for 30-180 seconds during which time the activity of the steam reforming catalyst, as measured by the mole percent conversion of charge toluene to product hydrogen, decreases during a reaction period;

interrupting said reaction period when the activity of said catalyst has decreased, said interrupting being effected by decreasing the flow of said charge hydrocarbon;

contacting said catalyst of decreased activity with steam during a regeneration period at regenerating conditions including temperature of 800°-1100° F, as the activity of said catalyst increases thereby forming regenerated catalyst; and recovering product gas containing hydrogen.

15. The method of steam reforming charge toluene as claimed in claim 14 which comprises passing a mixture of steam and toluene into contact with a steam reforming catalyst at steam reforming conditions including temperature of 800°-1100° F for 30-180 seconds during which time the activity of the steam reforming catalyst, as measured by the mole percent conversion of charge toluene to product hydrogen has decreased to less than about 90% of the initial activity during a reaction period;

interrupting said reaction period when the activity of said catalyst has decreased to less than about 90%, said interrupting being effected by decreasing the flow of said charge hydrocarbon;

contacting said catalyst of decreased activity with steam during a regeneration period at regenerating conditions including temperature of 800°-1100° F as the activity of said catalyst increased to at least about 75% of its initial activity thereby forming regenerated catalyst; and recovering product gas containing hydrogen.

16. The method of steam reforming charge stream containing paraffin hydrocarbons which comprises passing a mixture of steam and said charge stream into contact with a steam reforming catalyst at steam reforming conditions including temperatures of 800°-1100° F, pressure of 0-100 psig, and steam to hydrocarbon mole ratio of 25-125:1 for 30-180 seconds during which time the activity of the steam reforming catalyst, as measured by the mole percent conversion of charge hydrocarbon to product hydrogen decreases to 50-90% of its initial activity during a reaction period;

interrupting said reaction period when the activity of said catalyst has decreased to a point at which the activity is less than 90% of the initial activity, said interrupting being effected by decreasing the flow of said charge hydrocarbon;

decreasing the flow of charge hydrocarbon to 0%–50% of that of the reaction period during a regenerating period;

contacting said catalyst of decreased activity with steam at regenerating conditions including temperature of 800°–1100° F, pressure of 0–100 psig, and a weight hourly space velocity WHSV of 0.1–2 for 90–540 seconds as the activity of said catalyst increases to 80%–100% of its initial activity thereby forming regenerated catalyst; and recovering product gas containing hydrogen.

17. The method of steam reforming charge hydrocarbon containing $C_9$–$C_{11}$ hydrocarbon components which comprises passing a mixture of steam and charge into contact with a steam reforming catalyst at steam reforming conditions including temperature of 800°–1100° F for 30–180 seconds during which time the activity of the steam reforming catalyst, as measured by the mole percent conversion of charge hydrocarbon to product hydrogen decreases to less than about 90% of the initial activity during a reaction period;

interrupting said reaction period when the activity of said catalyst has decreased to less than about 90%, said interrupting being effected by decreasing the flow of said charge hydrocarbon;

contacting said catalyst of decreased activity with steam during a regeneration period at regenerating conditions including temperature of 800°–1100° F, as the activity of said catalyst increases to at least about 75% of its initial activity thereby forming regenerated catalyst; and recovering product gas containing hydrogen.

* * * * *